US008131228B2

(12) United States Patent
Liao et al.

(10) Patent No.: US 8,131,228 B2
(45) Date of Patent: Mar. 6, 2012

(54) INTERFERENCE BASED PHASE SHIFT PRECODING FOR OFDM

(75) Inventors: Jingyi Liao, Beijing (CN); Lei Wan, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1239 days.

(21) Appl. No.: 11/832,314

(22) Filed: Aug. 1, 2007

(65) Prior Publication Data

US 2009/0036150 A1    Feb. 5, 2009

(51) Int. Cl.
*H03C 7/02* (2006.01)
(52) U.S. Cl. ............... 455/101; 455/114.2; 455/420; 455/422.1; 455/447; 455/501; 455/561; 370/208; 370/330; 370/345; 370/480; 375/267
(58) Field of Classification Search ............... 455/101, 455/501, 446, 447, 114.2, 115.1, 418–420, 455/422.1, 450, 9, 500, 504, 561; 370/208, 370/209, 330, 345, 343, 346, 480; 375/260, 375/267
See application file for complete search history.

(56) References Cited

U.S. PATENT DOCUMENTS

| | | | | |
|---|---|---|---|---|
| 5,867,478 | A * | 2/1999 | Baum et al. ............... | 370/203 |
| 6,088,416 | A | 7/2000 | Perahia et al. | |
| 6,842,487 | B1 | 1/2005 | Larsson | |
| 7,224,744 | B2 | 5/2007 | Giannakis et al. | |
| 2006/0193245 | A1* | 8/2006 | Aghvami et al. ............. | 370/208 |
| 2007/0104088 | A1 | 5/2007 | Mujtaba | |
| 2007/0153935 | A1* | 7/2007 | Yang et al. ................... | 375/267 |
| 2007/0270273 | A1* | 11/2007 | Fukuta et al. ................ | 475/206 |
| 2008/0095133 | A1* | 4/2008 | Kodo et al. .................... | 370/342 |
| 2009/0316807 | A1* | 12/2009 | Kim et al. ..................... | 375/260 |
| 2010/0054191 | A1* | 3/2010 | Higuchi et al. ............... | 370/329 |

FOREIGN PATENT DOCUMENTS

| | | |
|---|---|---|
| EP | 1 976 148 A | 10/2008 |
| WO | 2007/083568 A | 7/2007 |

OTHER PUBLICATIONS

International Search Report and Written Opinion mailed Mar. 4, 2009 in corresponding PCT application PCT/SE2008/050810.

(Continued)

*Primary Examiner* — Shaima Q Aminzay
(74) *Attorney, Agent, or Firm* — Nixon & Vanderhye, P.C.

(57) ABSTRACT

In a radio network a determination is made whether to implement cyclical delay diversity (CDD) for a radio frequency connection involving a radio base station (26) and a wireless terminal (30). The determination whether to implement cyclical delay diversity (CDD) is made in accordance with interference distribution at the wireless terminal (30), as such interference distribution is measured or otherwise perceived. When a determination is made to implement the cyclical delay diversity for the connection, plural transmit antennas (38) of the radio base station (26) are employed to implement the cyclical delay diversity for the connection. One or more indications of the interference distribution may be received and used to make the determination. The indication(s) of interference distribution can take the form of information received from the wireless terminal, and/or the form of frequency reuse plan information for interfering cells. For example, the determination to implement the cyclical delay diversity can be made affirmatively if the frequency reuse for interfering cells is above a predetermined frequency reuse number. In differing embodiments, either the radio base station (26) or the wireless terminal (30) can make the CDD implementation determination.

15 Claims, 12 Drawing Sheets

OTHER PUBLICATIONS

"Channel Dependent Scheduling with Cyclic Delay Diversity", 3GPP Draft R1-061192 Multi-Degree CDD, $3^{rd}$ Generation Partnership Project (3GPP), 3GPP TSG-RAN WG1 Meeting #45, Shanghai, China, Mobile Conference Center, May 8-12, 2006.

A. Lodhi, F. Said, M. Dohler, and A. H. Aghvami, "Performance comparison of space-time block coded and cyclic delay diversity MC-CDMA systems," in IEEE Wireless Communication Magazine, pp. 38-45, Apr. 2005.

G. Bauch, J. S. Malik, "Parameter optimization, interleaving and multiple access in OFDM with cyclic delay diversity," In proc. VTC 2004, pp. 505-509, 2004.

Samsung, R1-051046, further details on adaptive cyclic delay diversity scheme, 3GPP TSG RAN WG1 meeting 42bis, San Diego, USA, Oct. 10-14, 2005.

Samsung, R1-051047, System performance of adaptive cyclic delay diversity scheme, 3GPP TSG RAN WG1 meeting 42bis, San Diego, USA, Oct. 10-14, 2005.

R1-063345,"CDD-based Precoding for E-UTRA downlink MIMO", RAN1 #47, LGE, Samsung, NTT-Docomo.

Tech. Spec., 3GPP TR 25.814, V7.1.0 (Sep. 2006); $3^{rd}$ Generational Partnership Project; Technical Specification Group Radio Access Network; Physical Layer Aspects for Evolved Universal Terrestrial Radio Access (UTRA) (Release 7).

Tech. Spec. 3GPP TS 36.300, V0.5.0 (Feb. 2007), $3^{rd}$ Generational Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8).

* cited by examiner

INTERFERENCE BASED PHASE SHIFT PRECODING FOR OFDM

BACKGROUND

I. Technical Field

The present invention pertains to wireless telecommunications, and particularly to determining whether to enhance diversity in an Orthogonal Frequency-Division Multiplexing (OFDM) system.

II. Related Art and other Considerations

Frequency division multiplexing (FDM) is a technology that transmits multiple signals simultaneously over a single transmission path. Each signal travels within its own unique frequency range (carrier), which is modulated by the data (text, voice, video, etc.). Orthogonal FDM's (OFDM) spread spectrum technique distributes the data over a large number of carriers that are spaced apart at precise frequencies. This spacing provides the "orthogonality" in this technique which prevents the demodulators from seeing frequencies other than their own. The benefits of OFDM are high spectral efficiency, resiliency to RF interference, and lower multi-path distortion. This is useful because in a typical terrestrial broadcasting scenario there are multipath-channels (i.e., the transmitted signal arrives at the receiver using various paths of different length). Since multiple versions of the signal interfere with each other (inter symbol interference (ISI)) it becomes very hard to extract the original information.

Diversity techniques are used for reducing the errors in the transfer of a single data stream. Diversity gives an increase in the robustness of the signal path. This means there will be an increase in the maximum data rate at any given distance.

Multi-carrier based radio access schemes such as Orthogonal Frequency-Division Multiplexing (OFDM), Multi-Access OFDM, and Discrete Fourier Transform (DFT)-spread OFDM have been treated as the most promising candidates for many standards due to their capabilities of combating multi-path propagation and supporting frequency-domain multi-user diversity, like 3GPP-LTE, WLAN(802.11n) and WiMAX (802.16). For both single-user frequency diversity mode and multi-user diversity mode, the achievable gain depends on frequency selectivity over the whole spectrum. The frequency selectivity is determined by, e.g., the practical channel condition. Generally, a small delay spread ends to a very flat channel in frequency domain, where the frequency-domain multi-user diversity gain could be very limited. An extreme example is the line of sight (LoS) channel.

To solve the problem of limited gain, a method called cyclic delay diversity (CDD) has been proposed with multiple antennas at transmit side. Cyclic Delay Diversity (CDD) is a technique which introduces spatial diversity to an Orthogonal Frequency Division Multiplexing (OFDM) based transmission scheme that itself may have no built-in diversity. CCD is described in the following non-exhaustive list of documents (all of which are incorporated herein by reference in their entirety):

A. Lodhi, F. Said, M. Dohler, and A. H. Aghvami, "Performance comparison of space-time block coded and cyclic delay diversity MC-CDMA systems," in IEEE Wireless Communication Magazine, pp. 38-45, April, 2005

G. Bauch, J. S. Malik, "Parameter optimization, interleaving and multiple access in OFDM with cyclic delay diversity," In proc. VTC 2004, pp. 505-509, 2004

Samsung, R1-051046, further details on adaptive cyclic delay diversity scheme, 3GPP TSG RAN WG1 meeting 42 bis, San Diego, USA, 10-14 October, 2005.

Samsung, R1-051047, System performance of adaptive cyclic delay diversity scheme, 3GPP TSG RAN WG1 meeting 42 bis, San Diego, USA, 10-14 October, 2005

Peter Larsson, "Cyclic delay diversity for mitigating intersymbol interference in OFDM systems", U.S. Pat. No. 6,842,487, prio.-date Sep. 22, 2000

R1-063345, "CDD-based Precoding for E-UTRA downlink MIMO", RAN1 #47, LGE, Samsung, NTT-Docomo.

CDD-based precoding can be defined by combining a linearly increasing phase-shift diagonal matrix and a unitary precoding matrix as shown by Expression (1). For instance, the CDD-based precoding matrix for the number of transmit antennas $N_t$ with spatial multiplexing rate can be defined by combining a phase-shift diagonal matrix and a precoding matrix. In Expression (1), k and $\theta_i, i=1, \ldots, N_t-1$ denote subcarrier index and phase angles according to the delay samples respectively.

$$\begin{bmatrix} 1 & 0 & \ldots & 0 \\ 0 & e^{j\theta_1 k} & & 0 \\ \vdots & & \ddots & \vdots \\ 0 & 0 & \ldots & e^{j\theta_{N-1} k} \end{bmatrix} \begin{bmatrix} R \text{ columns of} \\ \text{size } Nt \\ \text{Unitary matrix} \end{bmatrix} \quad \text{Expression (1)}$$

The signals transmitted from different antennas are copies of one time-domain OFDM symbol, each copy with different amount of cyclical shifts. For OFDM system, by doing so, an artificial multipath environment is generated to provide or enlarge the frequency selectivity. Apparently, the system performance depends on the cyclic delay value. In G. Bauch, J. S. Malik, "Parameter optimization, interleaving and multiple access in OFDM with cyclic delay diversity," In proc. VTC 2004, pp. 505-509, 200, a methodology to determinate cyclic delay value is presented without the consideration of subcarrier allocation. In others of the above-listed documents, several methods are proposed together with sub-carrier allocation which suggests that cyclic delay should be used for the frequency-domain multi-user diversity mode whereas one large valued set of cyclic delay should be used for the single-user frequency-domain diversity mode. That is, two types of delay samples such as a large delay sample and a small delay sample are used for different cases: the CDD-based precoding with the large delay sample in the transmit antennas is used to obtain transmit diversity gain, and multi-user frequency domain scheduling with small delay sample in the transmit antennas is used to obtain multi-user diversity.

There is no single multi-antenna solution that works well for all the scenarios with different channel conditions, antenna configurations, bandwidths, terminal capabilities and user mobility. Consequently, to ensure good system spectrum efficiency, the adaptive multi-antenna technology has received more and more attention recently. As an example, spatial-domain multiplexing with precoding and dynamic rank adaptation is the most promising solution. Spatial domain multiplexing supports multi-stream transmission among multiple antenna elements, which works very well at the high-rank channels. However, for the low-rank channels, e.g., less-scattering channel or with small transmit antenna separation, multi-stream transmission ends to strong inter-stream interference, thus the single-stream with beamforming is preferred.

The (fractional) frequency reuse is a well known technology. See, for instance, U.S. Pat. No. 6,088,416, incorporated herein by reference. Frequency reuse has the ability to use the same frequencies repeatedly across a cellular system, since each cell is designed to use radio frequencies only within its boundaries, the same frequencies can be reused in other cells not far away with little potential for interference. The reuse of frequencies is what enables a cellular system to handle a huge number of calls with a limited number of channels. On the other hand, The Inter-cell Interference Coordination (ICIC) technology has the task to manage radio resources (notably the radio resource blocks) such that inter-cell interference is kept under control. See, e.g., 3GPP TS 36.300, "Technical Specification Group Radio Access Network Evolved Universal Terrestrial Radio Access (E-UTRA) and Evolved Universal Terrestrial Radio Access Network (E-UTRAN)", 2007-02, incorporated herein by reference. As used herein, a resource block is a number (M) of consecutive sub-carriers for a number (N) of consecutive OFDM symbols.

For an OFDM system, introducing CDD in precoding can introduce a linear phase shift to the frequency channels, which can help to obtain frequency scheduling gain in the flat channel scenario. See, e.g., Samsung, R1-051047, System performance of adaptive cyclic delay diversity scheme, 3GPP TSG RAN WG1 meeting 42 bis, San Diego, USA, 10-14 Oct. 2005. FIG. 1 shows Mean user throughput PFTF for per stream rate control (PARC) and selective per stream rate control (S-PARC) with and without CDD preceding in single cell with flat channel. Thus, FIG. 1 shows that, in the single-cell with flat channel scenario, the CDD can improve system performances for the frequency-domain scheduler, e.g., PFTF (proportional fair in both time and frequency domain), since the CDD can get more frequency channel variation, and due to the fact that there is only white noise, the fading variation of the frequency channel has an effect of the SINR variation in the frequency domain. FIG. 1 shows mean user throughput PFTF for per stream rate control (PARC) and selective per stream rate control (S-PARC) with and without CDD preceding in single cell with flat channel.

However, whether a CDD-based linear phase shift scheme can obtain more multi-user gains (e.g., by a frequency domain scheduler) over the system without CDD depends on whether it can obtain more frequency domain SINR variations. Not only the channel models, but also interference distribution and whether rank adaptation is used will impact its performance. FIG. 2 illustrates mean user throughput PFTF for PARC and S-PARC with and without CDD preceding in a multi cell with suburban SCM channel. FIG. 2 thus shows that CDD does not provide any interesting gains in a multi-cell scenario with frequency reuse equal to one. See, e.g., 3GPP TR 25.814, "3rd Generation Partnership Project; Technical Specification Group Radio Access Network; Physical Layer Aspects for Evolved UTRA (Release 7)". Different UEs have different interference distribution, with frequency domain scheduler, different UEs are allocated to different resource blocks, the variation of interference in resource blocks have already introduced different SINR distributions to the frequency domain resource blocks. Thus, the CDD-based linear phase shift scheme could not introduce more multiuser diversity gain in the multi-cell scenario with suburban SCM channel What is needed, therefore, and an object of the present invention, are one or more of apparatus, methods, and techniques for selectively implementing CDD based on interference distribution and environment.

BRIEF SUMMARY

In a radio network a determination is made whether to implement cyclical delay diversity for a radio frequency connection involving a radio base station and a wireless terminal. The determination whether to implement cyclical delay diversity is made in accordance with interference distribution at the wireless terminal, as such interference distribution is measured or otherwise perceived. When a determination is made to implement the cyclical delay diversity for the connection, plural transmit antennas of a radio base station are employed to implement the cyclical delay diversity for the connection.

An example embodiment includes receiving one or more indications of the interference distribution and using the indication(s) of the interference distribution to make the determination.

In one example mode, the indication of interference distribution can take the form of information received from the wireless terminal, such as a measured signal to interference noise ratio (SINR) from the wireless terminal. For example, the determination to implement the cyclical delay diversity can be made affirmatively if the indication of the interference distribution indicates that noise is a greater factor than interference for a signal to interference noise ratio (SINR) for the wireless terminal.

In another example mode, the indication of interference distribution can take the form of frequency reuse plan information for interfering cells. For example, the determination to implement the cyclical delay diversity can be made affirmatively if the frequency reuse for interfering cells is above a predetermined frequency reuse number.

In yet another example mode, the determination whether to implement the cyclical delay diversity is made in accordance with two criteria. A first criteria comprises frequency reuse plan information for interfering cells; a second criteria comprises interference power as measured at the wireless terminal. For example, in an example implementation, a determination not to implement the cyclical delay diversity is made if either a first criteria or the second criteria indicates that cyclical delay diversity is not necessary to obtain signal gain for the wireless terminal. On the other hand, a determination to implement the cyclical delay diversity is made if both the first criteria and the second criteria indicate that cyclical delay diversity is desirable to obtain the signal gain for the wireless terminal.

In an example mode, the technology has the effect of implementing the cyclical delay diversity for the wireless terminal in a noise-dominated area of a cell served by the radio base station, but not implementing the cyclical delay diversity for the wireless terminal in an interference-dominated area of the cell served by the radio base station.

In an example embodiment, the radio base station makes the determination whether to implement the cyclical delay diversity. For example, a controller of the radio base station can make the determination.

In another example embodiment, the wireless terminal can make the determination whether to implement the cyclical delay diversity. In such embodiment, the wireless terminal communicates the determination to the radio base station, so that the radio base station can implement or not implement the cyclical delay diversity as the case may be.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

Figure 1:
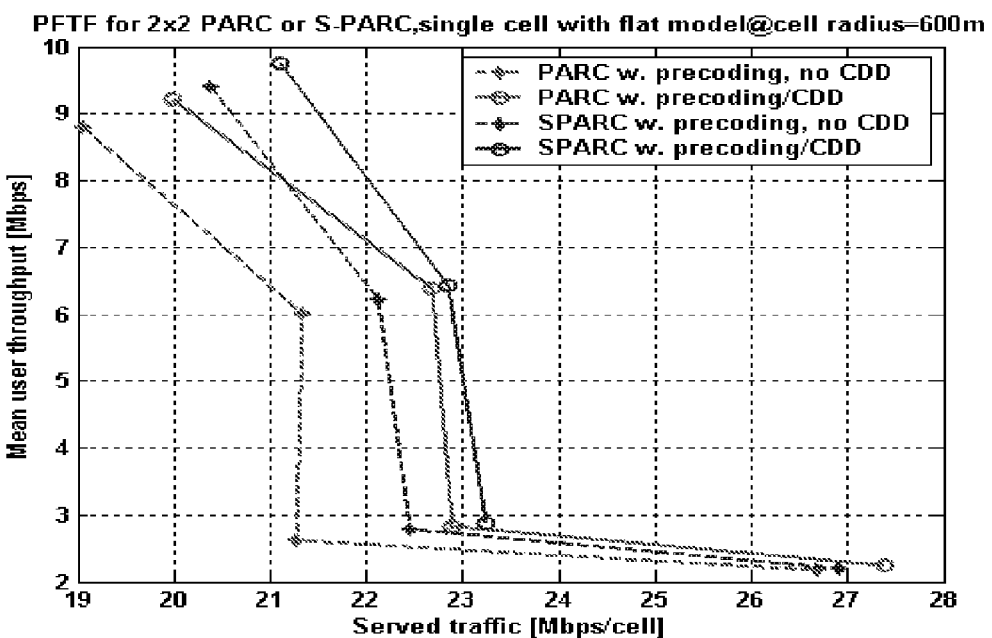
FIG. 1 is a graph illustrating how, in the single-cell with flat channel scenario, the CDD can improve system performances for the frequency-domain scheduler.
Figure 2:
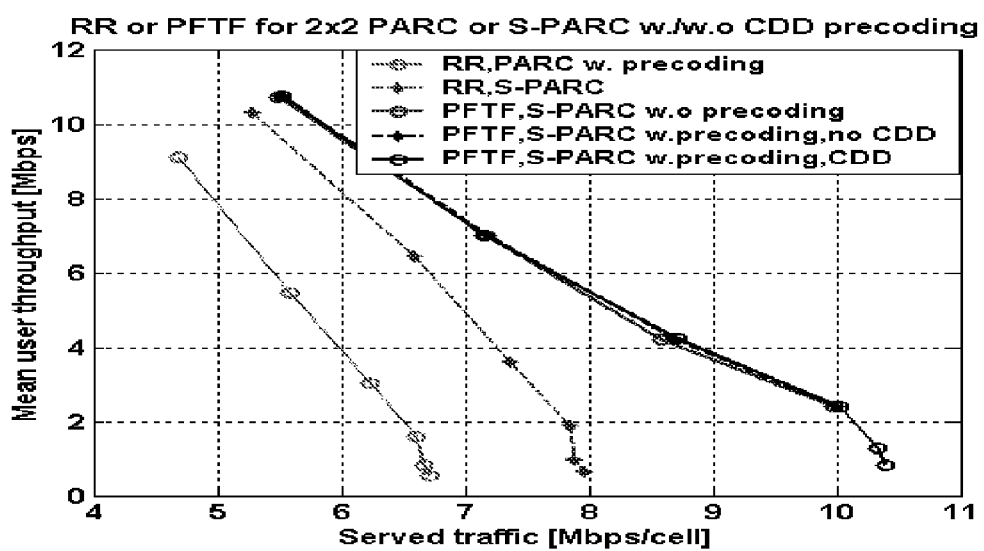
FIG. 2 is a graph illustrating how CDD does not provide any interesting gains in multi-cell scenario with frequency reuse equal to one.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Multiple Input, Multiple Output (MIMO) Orthogonal Frequency Division Multiplexing is a technology that uses multiple antennas to transmit and receive radio signals. MIMO-OFDM allows service providers to deploy a Broadband Wireless Access (BWA) system that has Non-Line-of-Sight (NLOS) functionality. Specifically, MIMO-OFDM takes advantage of the multipath properties of environments using base station antennas that do not have LOS.

To well exploit the CDD to MIMO system, the technology described herein considers interference distribution and environment for selectively implementing cyclic delay diversity (CDD). Documents such as those aforementioned do not cover the scenario-dependent applications of CDD technologies.

In accordance with the present technology, in a radio network a determination is made whether to implement cyclical delay diversity for a radio frequency connection involving a radio base station and a wireless terminal. The determination whether to implement cyclical delay diversity is made in accordance with interference distribution at the wireless terminal, as such interference distribution is measured or otherwise perceived. When a determination is made to implement the cyclical delay diversity for the connection, plural transmit antennas of a radio base station are employed to implement the cyclical delay diversity for the connection. In example embodiments, one or more indications of the interference distribution are received and used for making the determination whether or not to implement the cyclical delay diversity for the connection.

Figure 3:
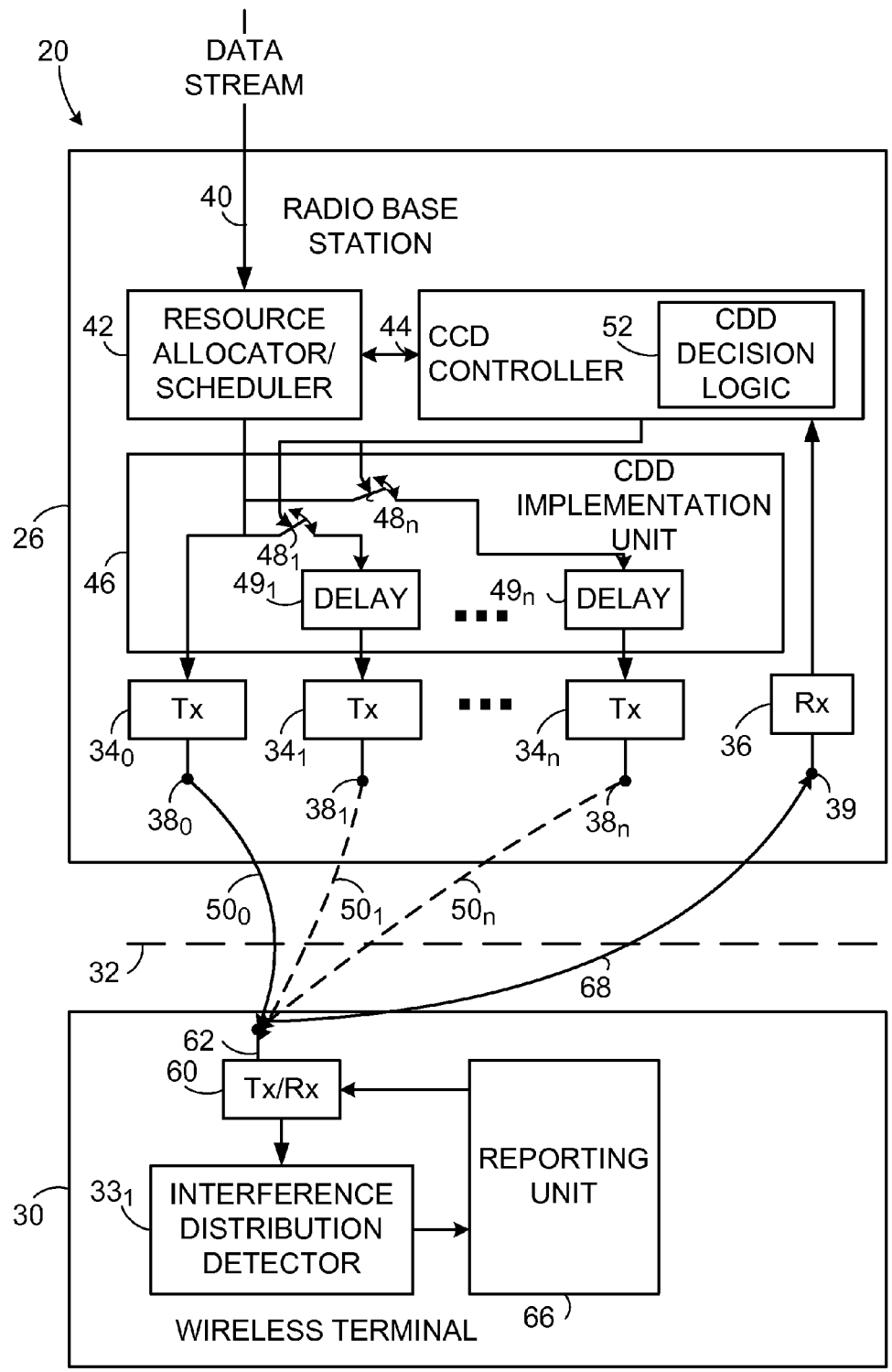
FIG. 3 is a diagrammatic view of an example embodiment wherein an indication of interference distribution is received from a wireless terminal and a cyclic delay diversity (CDD) implementation determination is made by a radio base station.

FIG. 3 shows an example embodiment wherein the indication of interference distribution can take the form of information received from a wireless terminal. In particular, FIG. 3 shows a radio network 20 comprising radio base station 26 and wireless terminal 30 which communicate across a radio (air) interface 32. For communication over radio interface 32, radio base station 26 comprises plural transmitters $34_0$ through $34_n$, as well as at least one receiver 36. The plural transmitters $34_0$ through $34_n$, each have an associated transmit antenna $38_0$ through $38_n$. Receiver 36 has receive antenna 39. Although separately illustrated, receiver 36 can be included in a transceiver (e.g., combined with one of the transmitters 34).

Radio base station 26 can take the name and function of other comparably denominated nodes such as base station, base transceiver station (BTS), node_B, or NodeB. Further, it will be understood that plural radio base stations comprise the radio network 20, and that the plural radio base stations are connected to associated control nodes of the network, e.g., radio network controller (RNC) nodes in the case of UTRAN, for example. For simplification, the radio network is illustrated as only comprising the radio base station 26, although it will be understood that the radio base station 26 is connected to one or more of these other nodes. In a multi-cell scenario, transmissions from each radio base station covers a field (e.g., a cell). The radio base stations are inter-connected physically or logically. By logical connection it is meant that the radio base stations can exchange signals (including, for example, frequency reuse information) via other nodes such as radio network controller nodes, for example).

The wireless terminal can be called by other names and comprise different types of equipment. For example, the wireless terminal can also be called a mobile station, wireless station, or user equipment units (UEs), and can be equipment such as mobile telephones ("cellular" telephones) and laptops with mobile termination, and thus can be, for example, portable, pocket, hand-held, computer-included, or car-mounted mobile devices which communicate voice and/or data with radio access network.

A data stream destined for transmission from radio base station 26 to wireless terminal 30 (depicted by arrow 40) is applied to resource allocator/scheduler 42. The resource allocator/scheduler 42 serves to allocate resource blocks (e.g., a number of consecutive sub-carriers for a number of consecutive OFDM symbols) for the connection to which the data stream belongs. The radio base station 26 further comprises a cyclic delay diversity (CDD) controller, e.g., CDD controller 44, which determines whether the data stream for the connection (as carried by the allocated resource blocks) is to be transmitted with or without cyclic delay diversity (CDD), e.g., is to be transmitted over one or more of the plural transmit antennas $38_0$ through $38_n$. To this end, CDD controller 44 is connected to CDD implementation unit 46.

The CDD implementation unit 46 is shown in simplified form as comprising switches $48_1$ through $48_n$ and delay elements $49_1$ through $49_n$. When switch $48_1$ is closed by CDD controller 44, the data stream for the connection is applied (after a time delay imposed by delay element $49_1$) to transmitter $34_1$ and its antenna $38_1$. Depending on whether cyclic delay diversity (CDD) is implemented or not, and the degree of such implementation, the data stream for the connection is applied to one or more successive transmitters and potentially to transmitter $34_n$ and its associated antenna $38_n$. Thus, at least in an "adaptive" implementation, each of the transmit antenna $38_1$ through $38_n$ can have a different delay or phase shift. FIG. 3 shows by arrow $50_0$ the transmission of the data stream from radio base station 26 to wireless terminal 30 over radio interface 32. If cyclic delay diversity (CDD) is implemented, transmission of the data stream also occurs from one or more of the diversity antennas $38_1$ through $38_n$, as indicated by arrows $50_1$ through $50_n$. Arrows $50_1$ through $50_n$ are shown by broken lines in view of their optional nature (e.g., since transmission from diversity antennas $38_1$ through $38_n$ depends on whether cyclic delay diversity (CDD) is implemented or not).

In the example embodiment of FIG. 3, the radio base station 26, and particularly CDD controller 44, makes the determination whether cyclic delay diversity (CDD) is to be implemented or not. Thus, FIG. 3 further shows CDD controller 44 as including CDD decision logic 52. The CDD decision logic 52 can comprise software (e.g., a coded set of instructions) executed by a processor or controller which makes the determination. The coded set of instructions can be stored in memory, e.g., in semiconductor memory (e.g., read only memory [ROM]) or other magnetic or electronic memory (e.g., on CD, floppy disk, etc.). In order to make its decision, the CDD decision logic 52 receives the aforementioned indication of interference distribution. The determination made by CDD decision logic 52 whether to implement the cyclical delay diversity can be made affirmatively if the indication of the interference distribution indicates that noise is a greater factor than interference for a signal to interference noise ratio (SINR) for the wireless terminal. In the FIG. 3 example, CDD decision logic 52 receives the indication of interference distribution from wireless terminal 30.

The wireless terminal 30 of the embodiment of FIG. 3 comprises a transceiver 60 connected to antenna 62. The transceiver 60 receives the information transmitted over radio interface 32 from radio base station 26, and further comprises an interference distribution detector 64 which detects or measures the interference distribution as perceived by wireless terminal 30. As explained subsequently, the interference distribution can pertain to, be related, or be derived from the signal to interference noise ratio (SINR). The wireless terminal 30 further comprises reporting unit 66 which processes or formats the indication of interference distribution for inclusion in a report message which is transmitted by transceiver 60 back to radio base station 26. To this end, FIG. 3 shows by arrow 68 the transmission of an interference distribution indication message to radio base station 26, which is received by receiver 36 and forwarded to CDD decision logic 52.

Figure 4:
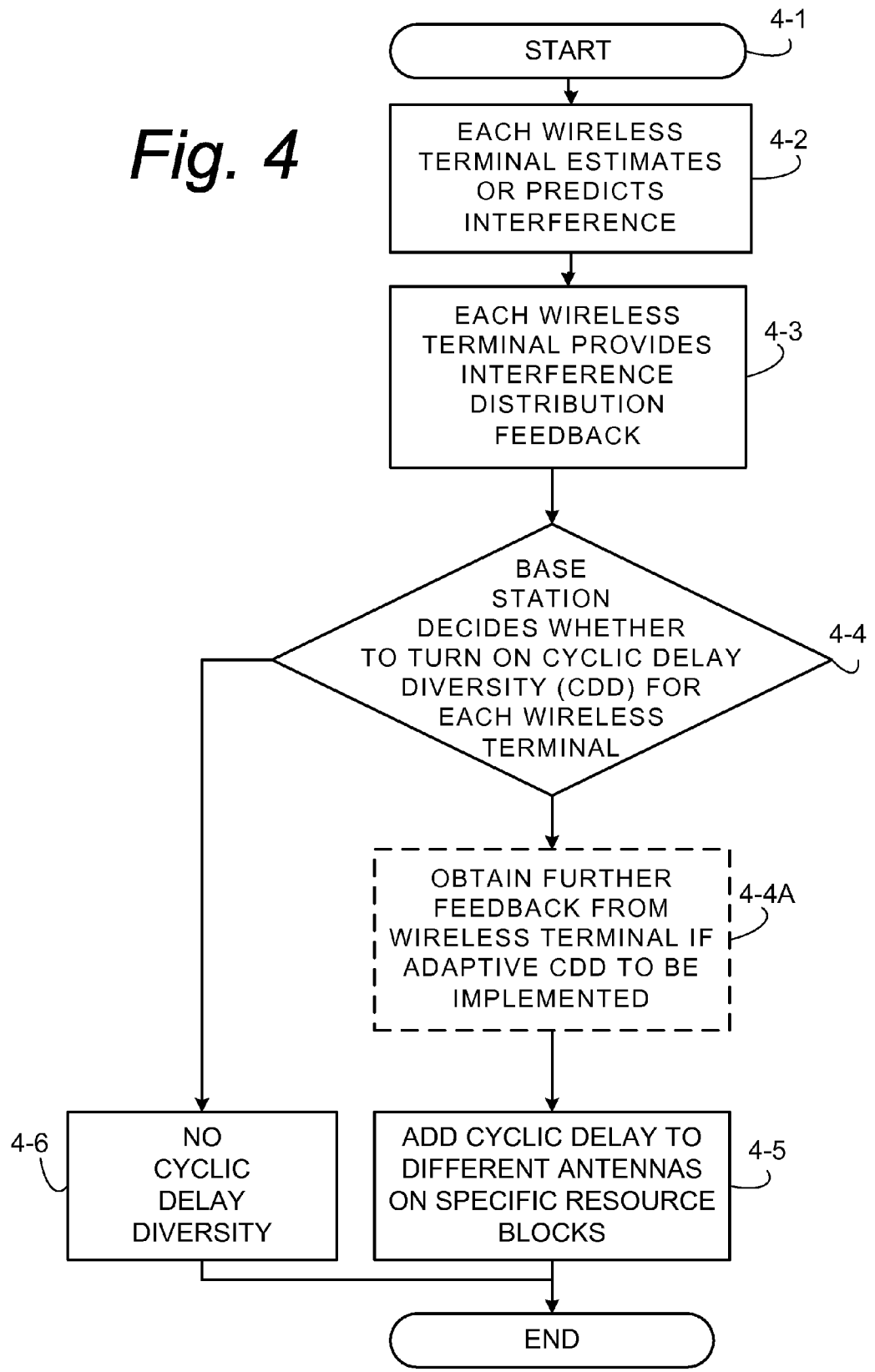
FIG. 4 is a flowchart illustrating example acts or steps performed by CDD decision logic for the embodiment of FIG. 3.

FIG. 4 illustrates example acts or steps performed by CDD decision logic for the embodiment of FIG. 3. Act 4-1 of the CDD decision logic of FIG. 4 reflects start of the cyclic delay diversity (CDD) decision process performed by CDD decision logic 52. The CDD decision process can be triggered or started by several events, such as (for example) when the wireless terminal 30 judges it is close to a cell center by SINR measurement or the wireless terminal 30 is with multi-streams transmission in case of a spatial multiplex system. Act 4-2 involves each wireless terminal estimating or predicting the interference; act 4-3 involves each wireless terminal providing interference distribution feedback (e.g., an interference distribution indication message 68) to radio base station. Act 4-4 involves base station 26, and in particular CDD decision logic 52, deciding whether to turn on cyclic delay diversity (CDD) for each wireless terminal.

Figure 5:
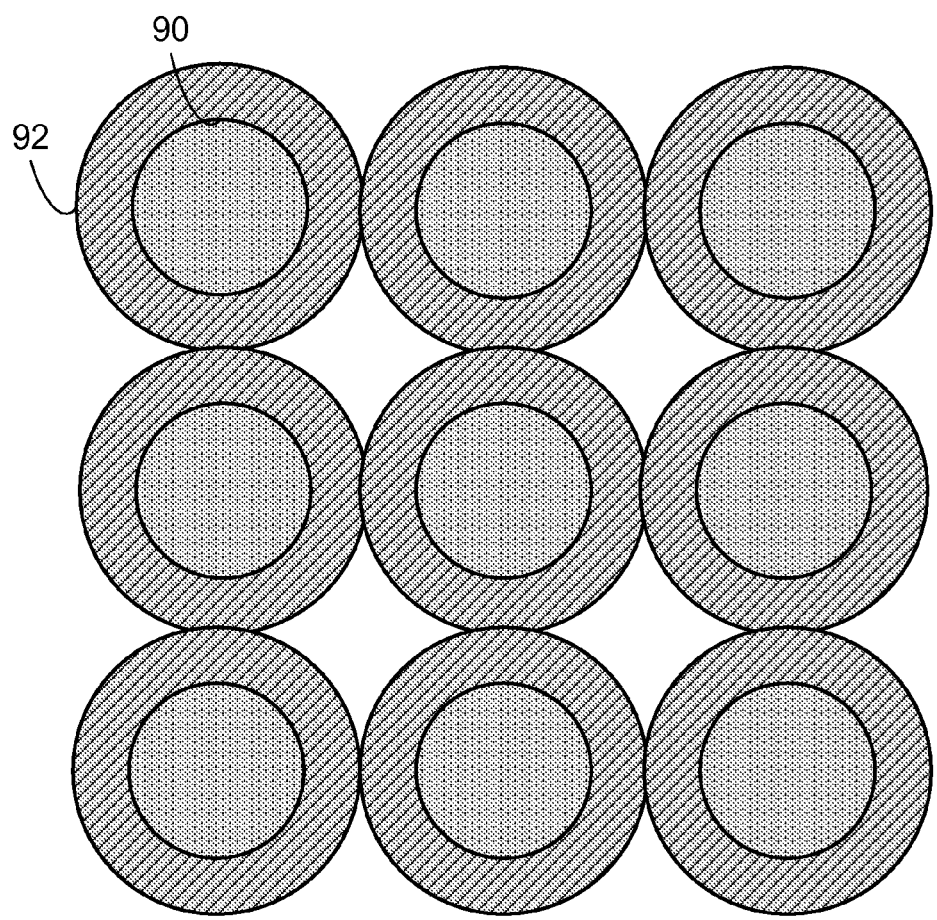
FIG. 5 is a diagrammatic view showing a network having cells, with each cell having a noise dominating area and an interference dominating area.

FIG. 5 shows the interference distribution for a resource block in a multi-cell system with frequency reuse equal to one (e.g., 1:1). Due to the co-channel interference, each cell can have two different areas i.e., centrally-located noise dominating area 90 and peripherally-located interference dominating area 92. The noise dominating area 90 is marked with stippling; the interference dominating area 92 is marked with hatching. Through the measurement of the channel by the wireless terminal, the wireless terminal can decide whether it is located in an interference or noise dominating area, e.g., in interference dominating area 92 or noise dominating area 90. For wireless terminals in the different areas, different processes can be employed. For the wireless terminal in the noise dominating area 90, since the interference is weak, the white noise dominates, i.e., the noise distribution in frequency is flat. In noise dominating area 90, the cyclic delay diversity (CDD) can introduce more frequency domain variation and accordingly the cyclic delay diversity (CDD) is turned on.

However, for a wireless terminal in interference dominating area 92, and since different wireless terminals are allocated to different resource blocks, the variation of interference in resource blocks already provides the frequency domain SINR variation, regardless of whether CDD could introduce more multi-user diversity gain. Thus, in the interference dominating area 92, there is no need to switch on the cyclic delay diversity (CDD). In an E-UTRA system, for example, the frequency and time allocations to map information for a certain wireless terminal to resource blocks is determined by the radio base station (e.g., NodeB) scheduler and may depend, e.g., on the frequency-selective CQI (channel-quality indicator) reported by the wireless terminal to the radio base station.

Thus, in reaching its decision, if the wireless terminal is located in the area where noise have the major contribution to SINR, e.g., close to the cell center (noise dominating area 90 in FIG. 5), CDD decision logic 52 can decide to turn on cyclic delay diversity (CDD). Act 4-5 of FIG. 4 reflects a turning on or implementation of cyclic delay diversity (CDD). On the other hand, if the wireless terminal locates in the area where interference has the major contribution to SINR, e.g., close to the cell edge (e.g., interference dominating area 92 in FIG. 5), the CDD decision logic 52 can decide to turn off (e.g., not implement) cyclic delay diversity (CDD). Act 4-6 of FIG. 4 reflects a turning off or non-implementation of cyclic delay diversity (CDD). After the decision is made, the system (e.g., radio base station 26) can then further employ frequency domain scheduler 42 and CDD implementation unit 46 to obtain the multi-user diversity gain.

When cyclic delay diversity (CDD) is implemented, the CDD may be either fixed cyclic delay diversity (CDD) or adaptive cyclic delay diversity (CDD). By "fixed delay" it is meant that the delay from one delay element 49 to another, and thus the delay from one transmit antenna 38 to another, is fixed or of the same delay interval. By "adaptive" it is meant that the delay can vary between antennas and/or over time. If the system employs fixed cyclic delay diversity (CDD), other than the interference distribution indication no further feedback from wireless terminal is needed. However, in case of an adaptive CDD system, those wireless terminals for which CDD is turned on also need to provide further feedback for the CDD-related parameters to the system, such further feedback being in the form of, e.g., delay or phase shift, etc. For this reason, FIG. 4 shows as optional act 4-4A, the radio base station obtaining such further feedback from the wireless terminal. It will also be appreciated that optionally such further feedback may instead be obtained at the time of obtaining the interference distribution (at the time of act 4-3).

Figure 6:
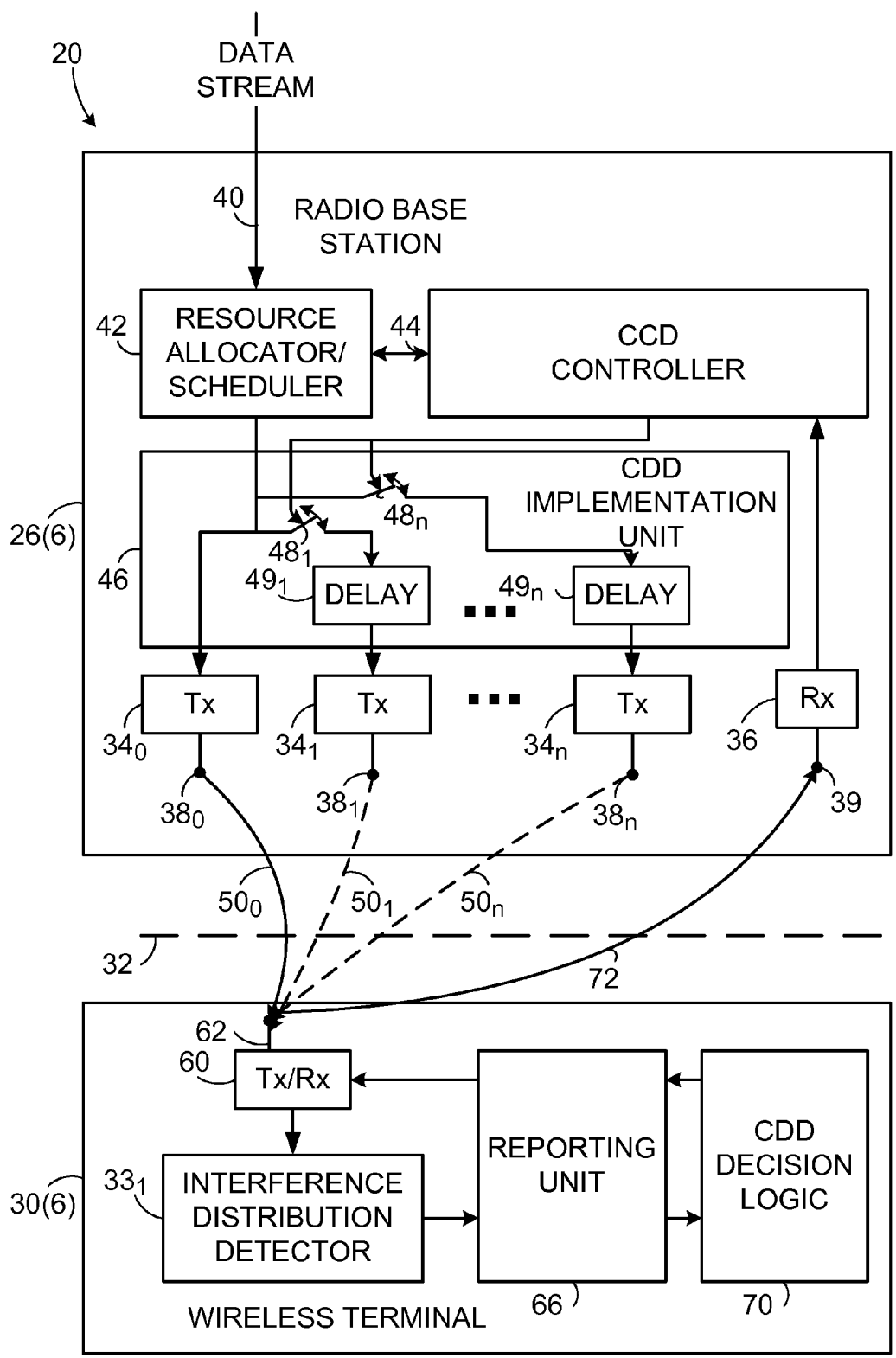
FIG. 6 is a diagrammatic view of an example embodiment wherein a cyclic delay diversity (CDD) implementation determination is made by a wireless terminal.

FIG. 6 shows another example embodiment wherein the indication of interference distribution can take the form of information received from a wireless terminal. However, in the example embodiment of FIG. 6 the cyclic delay diversity (CDD) implementation determination is made by wireless terminal 30(6). To this end, in addition to the example constituent functionalities shown in FIG. 3, wireless terminal 30(6) comprises CDD decision logic 70. The CDD decision logic 70 of wireless terminal 30(6) receives the indication of interference distribution [e.g., the signal to interference noise ratio (SINR)] and uses the indication of interference distribution, in a manner such as that described hereinafter, to make the determination whether cyclic delay diversity (CDD) is to be implemented. The determination made by CDD decision logic 70 whether to implement the cyclical delay diversity can be made affirmatively if the indication of the interference distribution indicates that noise is a greater factor than interference for a signal to interference noise ratio (SINR) for the wireless terminal.

In the example embodiment of FIG. 6, the reporting unit reports as message 72 the decision/determination by wireless terminal 30(6) whether or not cyclic delay diversity (CDD) is to be implemented. The CDD implementation message 72 is transmitted by transceiver 60 over radio interface 32 to receiver 36, from which it is relayed to CDD controller 44. In accordance with the determination made by wireless terminal 30(6), CDD controller 44 operates CDD implementation unit 46 so that one or more transmit antenna $38_1$ through $38_n$ are operative, as the case may be. Only transmit antenna $38_0$ is utilized if CDD is not implemented, whereas one or more of transmit antenna $38_1$ through $38_n$ may be utilized when CDD is implemented.

Figure 7:
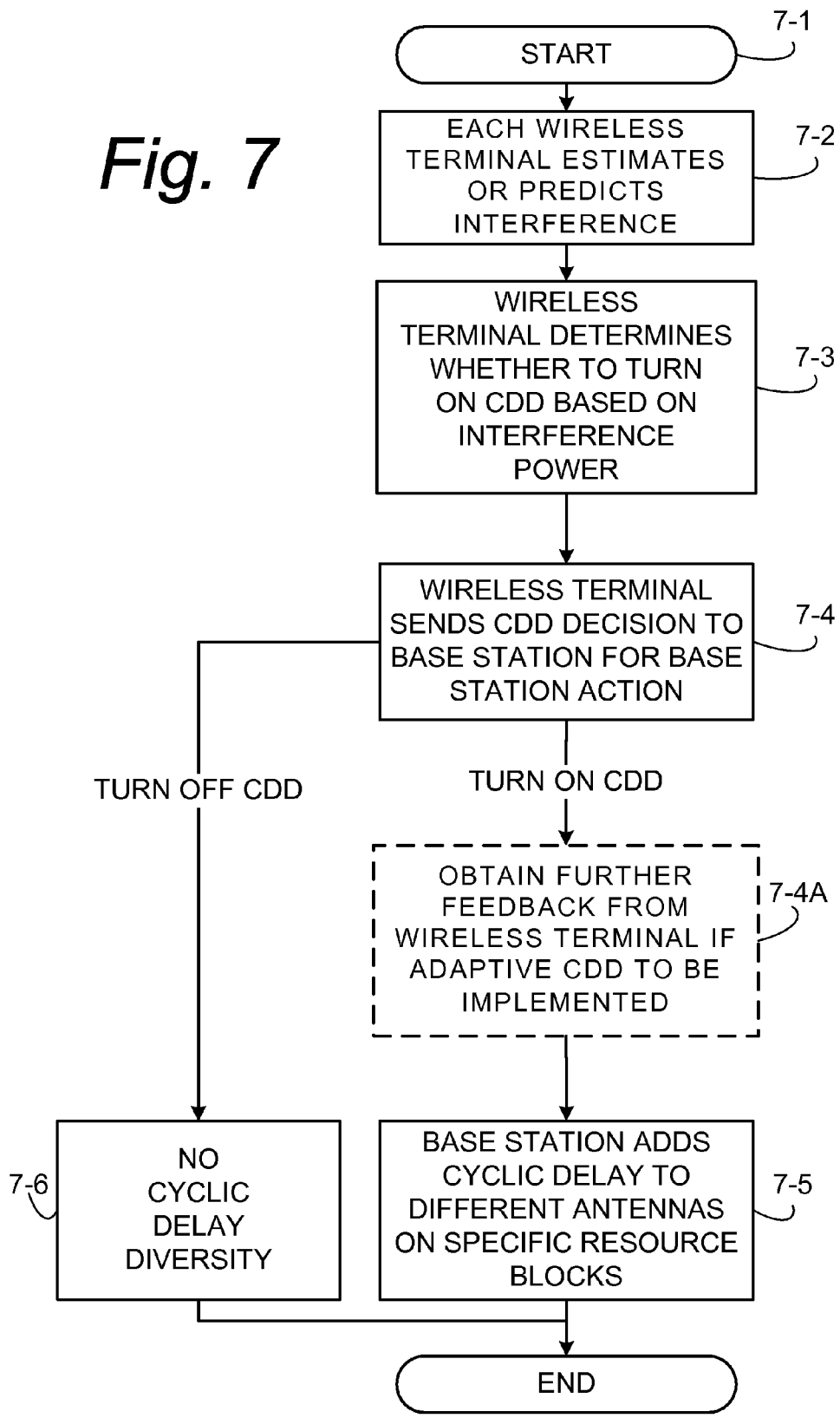
FIG. 7 is a flowchart illustrating example acts or steps performed by CDD decision logic for the embodiment of FIG. 6.

FIG. 7 illustrates example acts or steps performed by CDD decision logic for the embodiment of FIG. 6. Act 7-1 of the CDD decision logic of FIG. 7 reflects start of the cyclic delay diversity (CDD) decision process performed by CDD decision logic 70. The CDD decision process can be triggered or started by several events, such as (for example) when the wireless terminal 30 judges it is close to a cell center by SINR measurement or the wireless terminal 30 is with multi-streams transmission in case of a spatial multiplex system. Act 7-2, involves each wireless terminal estimating or predicting the interference. Act 4-3 involves each wireless terminal judging, according to the distribution of the interference perceived or measured by the wireless terminal, whether it is located at an area in which noise dominates the whole interference (e.g., noise dominating area 90 of FIG. 5) or an area in which the inter-cell interference dominates the whole interference (e.g., interference dominating area 92 of FIG. 5). As act 7-3, the CDD decision logic 70 of wireless terminal decides to turn on CDD if the white noise dominates the whole interference, but to turn off (e.g., not implement) CDD if the interference is dominate. As act 7-4 each wireless terminal then provides feedback to the radio base station of the wireless terminal's decision whether or not to turn on CDD, e.g., a CDD decision message 72 (see FIG. 6). Upon receipt of the CDD decision message 72 from wireless terminal 30(6), the radio base station 26(6) responds accordingly. If CDD is to be turned on, as act 7-5 the system (e.g., radio base station) further employs its frequency domain scheduler 42 and CDD implementation unit 46 to obtain the multi-user diversity gain. On the other hand, if the decision made by CDD decision logic 70 is negative, as act 7-6 the CDD is not turned on.

In like manner as FIG. 4, FIG. 7 shows as optional act 7-4A, the radio base station obtaining such further feedback from the wireless terminal as may be needed for implementation of adaptive CDD. It will also be appreciated that optionally such further feedback may instead be obtained at the time of obtaining the interference decision (at the time of act 7-4).

Figure 8:
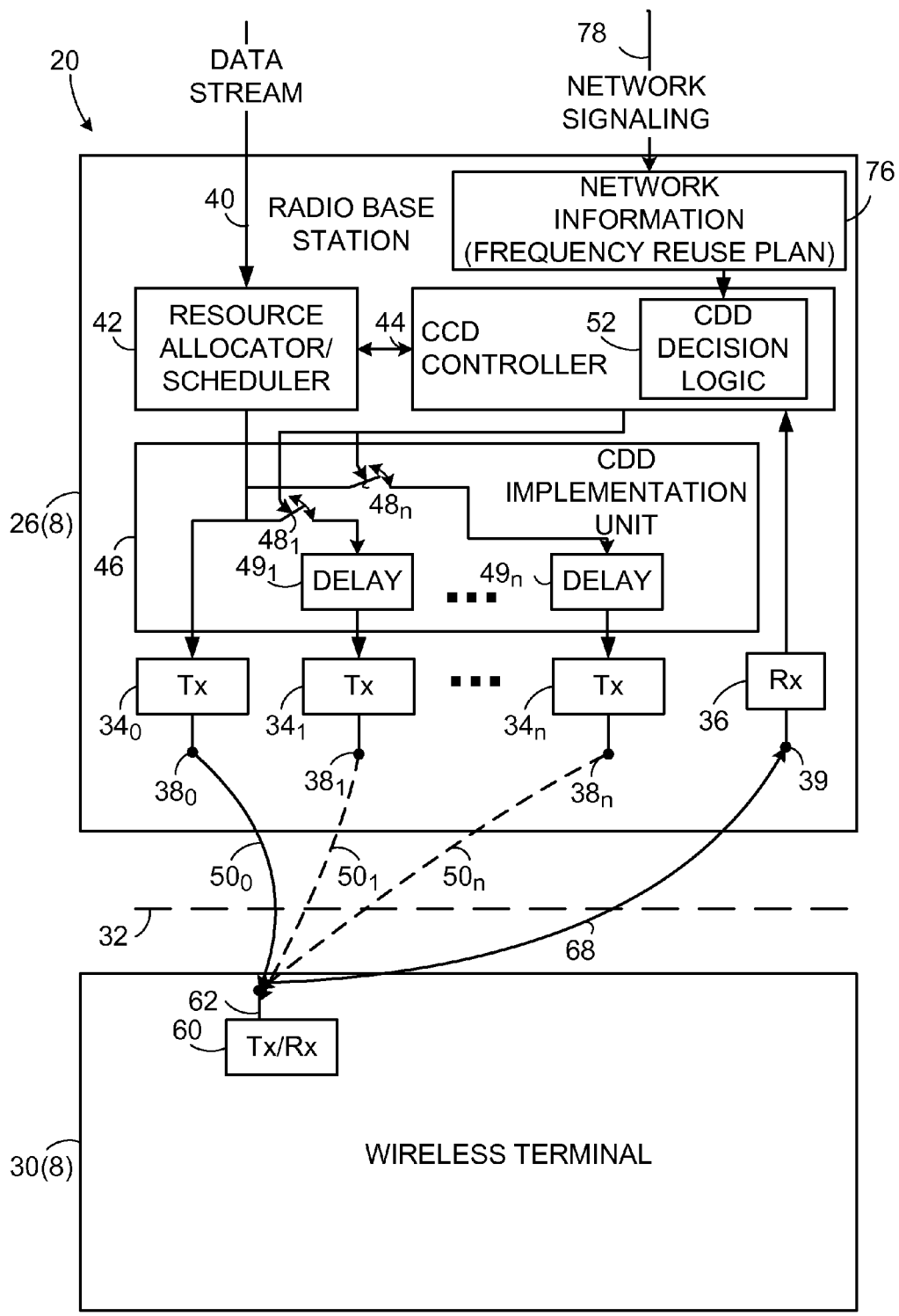
FIG. 8 is a diagrammatic view of an example embodiment wherein a cyclic delay diversity (CDD) implementation determination is made on the basis of frequency reuse plan information for interfering cells.

In another example mode illustrated by the example embodiment of FIG. 8, the indication of interference distribution can take the form of frequency reuse plan information for interfering cells. Like the embodiment of FIG. 3, the radio base station 26(8) of the embodiment of FIG. 8 comprises CDD decision logic 52. FIG. 8 further shows CDD decision logic 52 as having access to network information 76, which particularly includes at least relevant portions of a frequency reuse plan for the radio network 20. As indicated by signaling arrow 78, the frequency reuse plan for the radio network 20 can (in at least some example implementations) be received via network signaling or other messages from one or more other nodes, e.g., from other radio network nodes. As explained hereinafter, in the example embodiment of FIG. 8, the determination the determination to implement the cyclical delay diversity can be made affirmatively by CDD decision logic 52 if the frequency reuse for interfering cells is above a predetermined frequency reuse number.

Figure 9:
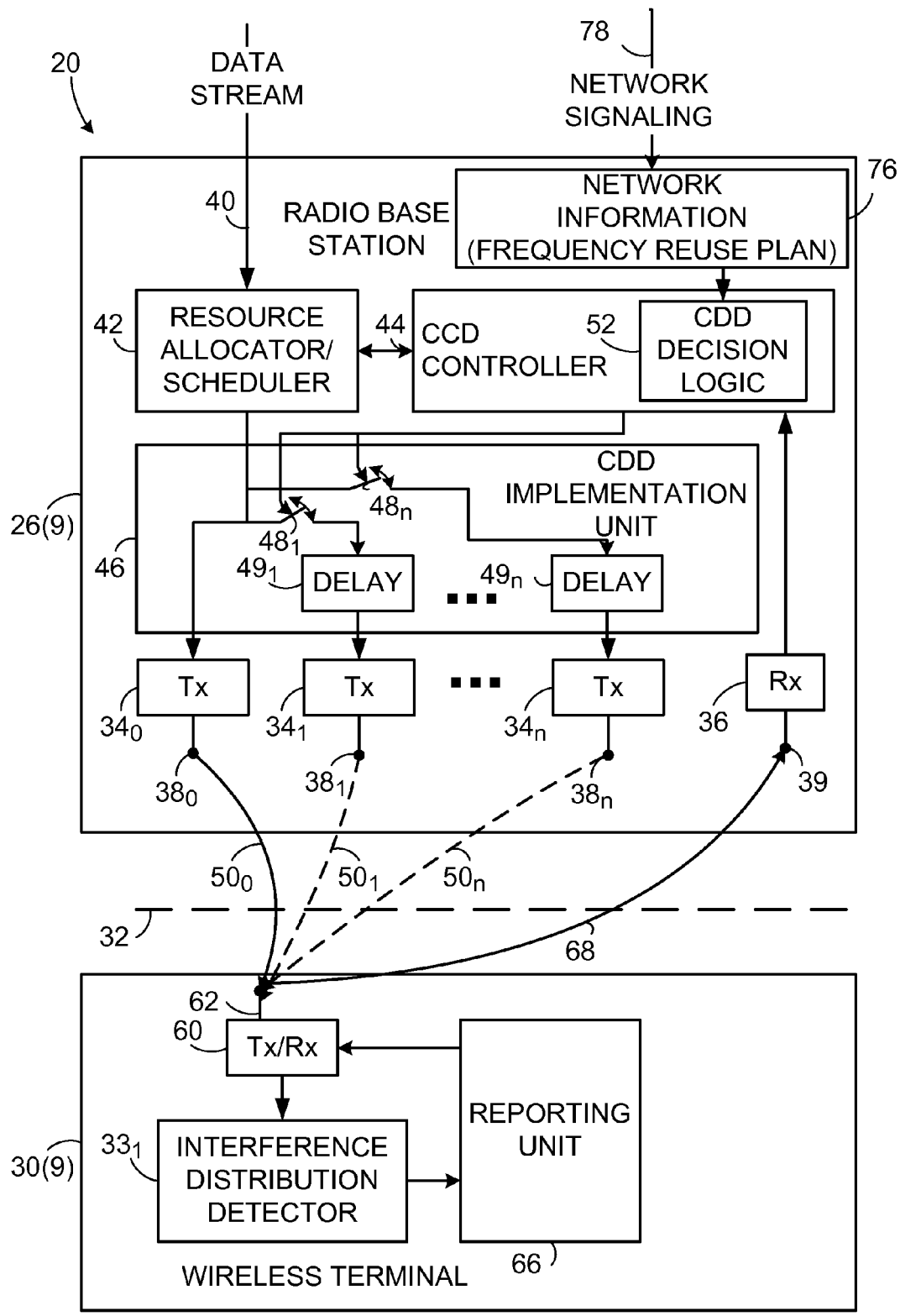
FIG. 9 is a diagrammatic view of an example embodiment wherein a cyclic delay diversity (CDD) implementation determination is made both on the basis of reported interference distribution and on the basis of frequency reuse plan information for interfering cells.

In yet another example mode and embodiment, illustrated by way of example in FIG. 9, the determination whether to implement the cyclical delay diversity is made in accordance with two criteria. A first criteria comprises frequency reuse plan information for interfering cells (similar to that of the embodiment of FIG. 8); a second criteria comprises interference power as measured (or otherwise perceived) at the wireless terminal (similar to that of the embodiment of FIG. 3). To this end, the radio base station 26(9) of FIG. 9, like the radio base station 26(8) of FIG. 8, includes network information 76. The CDD decision logic 52 of the radio base station 26(9) of FIG. 9 makes the determination whether to implement cyclic delay diversity (CDD) based both on the frequency reuse information as stored in network information 76, as well as the interference distribution information (e.g., signal to interference noise ratio (SINR)) reported by wireless terminal 30(9) (in like manner as described in conjunction with the embodiment of FIG. 3).

Figure 10:
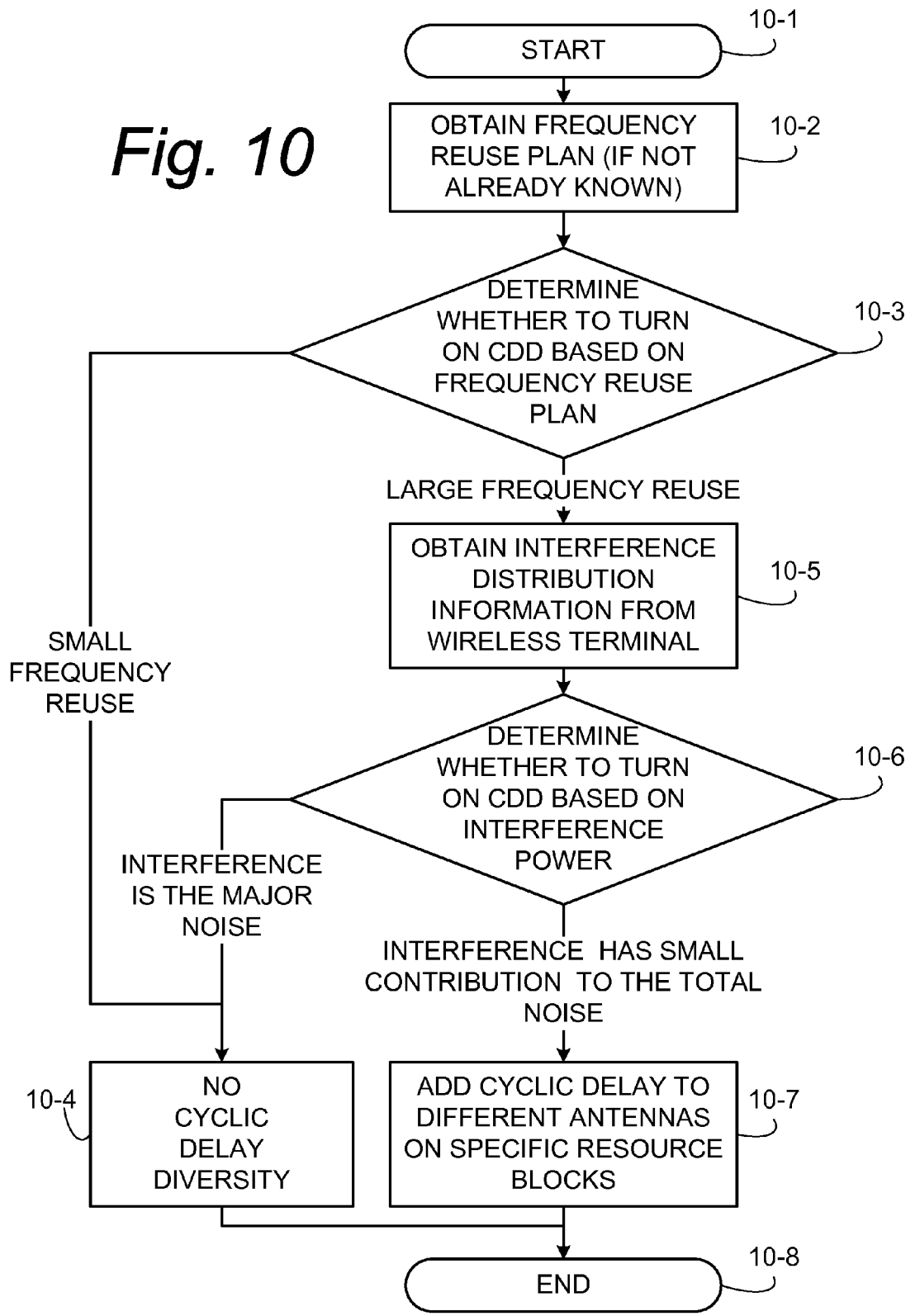
FIG. 10 is a flowchart illustrating example acts or steps performed by CDD decision logic for the embodiment of FIG. 9.

FIG. 10 shows an example of logic which is executed or otherwise utilized by CDD decision logic 52 for the embodiment of FIG. 9. In particular, FIG. 10 illustrates example acts or steps performed by CDD decision logic 52 for the embodiment of FIG. 9.

Act 10-1 of the CDD decision logic of FIG. 10 reflects start of the cyclic delay diversity (CDD) decision process. The CDD decision process can be triggered or started by several events, such as (for example) when the wireless terminal 30 judges it is close to a cell center by SINR measurement or the wireless terminal 30 is with multi-streams transmission in case of a spatial multiplex system.

As act 10-2 the CDD decision logic obtains the frequency reuse plan of the network (if not already known). The frequency reuse plan is shown in FIG. 9 as being stored in network information memory 76. The frequency reuse plan can be configured in network information memory 76, or can be fetched or periodically updated by network signaling (indicated by arrow 78) which carries the frequency reuse plan. As act 10-3, the CDD decision logic determines whether to turn on cyclic delay diversity (CDD) based on the frequency reuse plan. In particular, the CDD decision logic checks for the frequency(ies) involved in the resource block allocated to the connection by resource allocator/scheduler 42, and determines to what extent that/those frequency(ies) are utilized by other cells. If the frequency reuse is small, e.g., 1:1 (meaning that the same frequency(ies) are reused in an adjacent cell), then cyclic delay diversity (CDD) is not needed and no CDD is provided (act 10-4). On the other hand, if there is large frequency reuse (e.g., 7:1 or even 21:1, for example, or frequency reuse greater than a given [predetermined] threshold), processing continues with act 10-4.

As act 10-5 the CDD decision logic obtains the interference distribution information from the wireless terminal. The interference distribution information may be obtained through an interference distribution indication message 68 such as that depicted in FIG. 3, for example. Then, as act 10-6, the CDD decision logic determines whether to turn on cyclic delay diversity (CDD) based on interference power perceived or experienced at the wireless terminal. In particular, as act 10-6, the CDD decision logic makes a determination to implement the cyclical delay diversity if the interference distribution indication message indicates that the wireless terminal is in a noise-dominated area of a cell served by the radio base station. In this regard, in view of the noise domination, as act 10-7 the CDD decision logic adds cyclic delay diversity (CDD) to one or more of the transmits antenna $38_1$ through $38_n$ on the specific resource blocks utilized by the connection. On the other hand, if it is determined as act 10-6 that it is the interference power that is the major noise (relative to lesser white noise), no CDD is implemented (act 10-4). After the decision is made and the CDD is or is not added as acts 10-7 and 10-4, respectively, the CDD decision logic terminates as depicted by act 10-8.

Thus, as evidenced by the flowchart of FIG. 10, in an example implementation a determination not to implement the cyclical delay diversity is made if either a first criteria (frequency reuse plan check of act 10-3) or the second criteria (interference distribution check of act 10-6) indicates that cyclical delay diversity is not necessary to obtain signal gain for the wireless terminal. On the other hand, a determination to implement the cyclical delay diversity is made if both the first criteria (frequency reuse plan check of act 10-3) and the second criteria (interference distribution check of act 10-6) indicate that cyclical delay diversity is desirable to obtain the signal gain for the wireless terminal.

Figure 11:
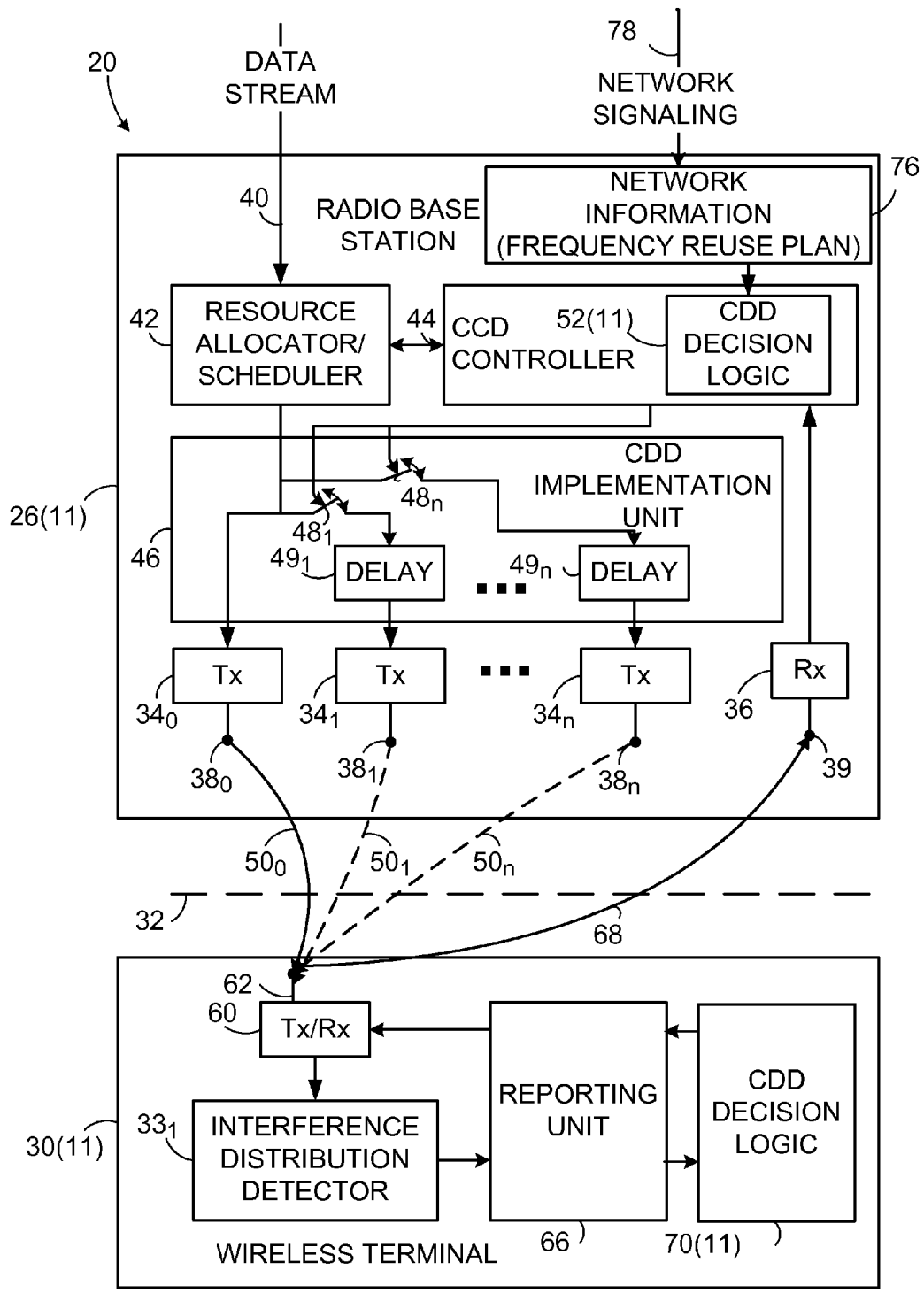
FIG. 11 is a diagrammatic view of yet another example embodiment wherein a cyclic delay diversity (CDD) implementation determination is made both on the basis of reported interference distribution and on the basis of frequency reuse plan information for interfering cells, and wherein the decision is distributed between a radio base station and a wireless terminal
Figure 12:
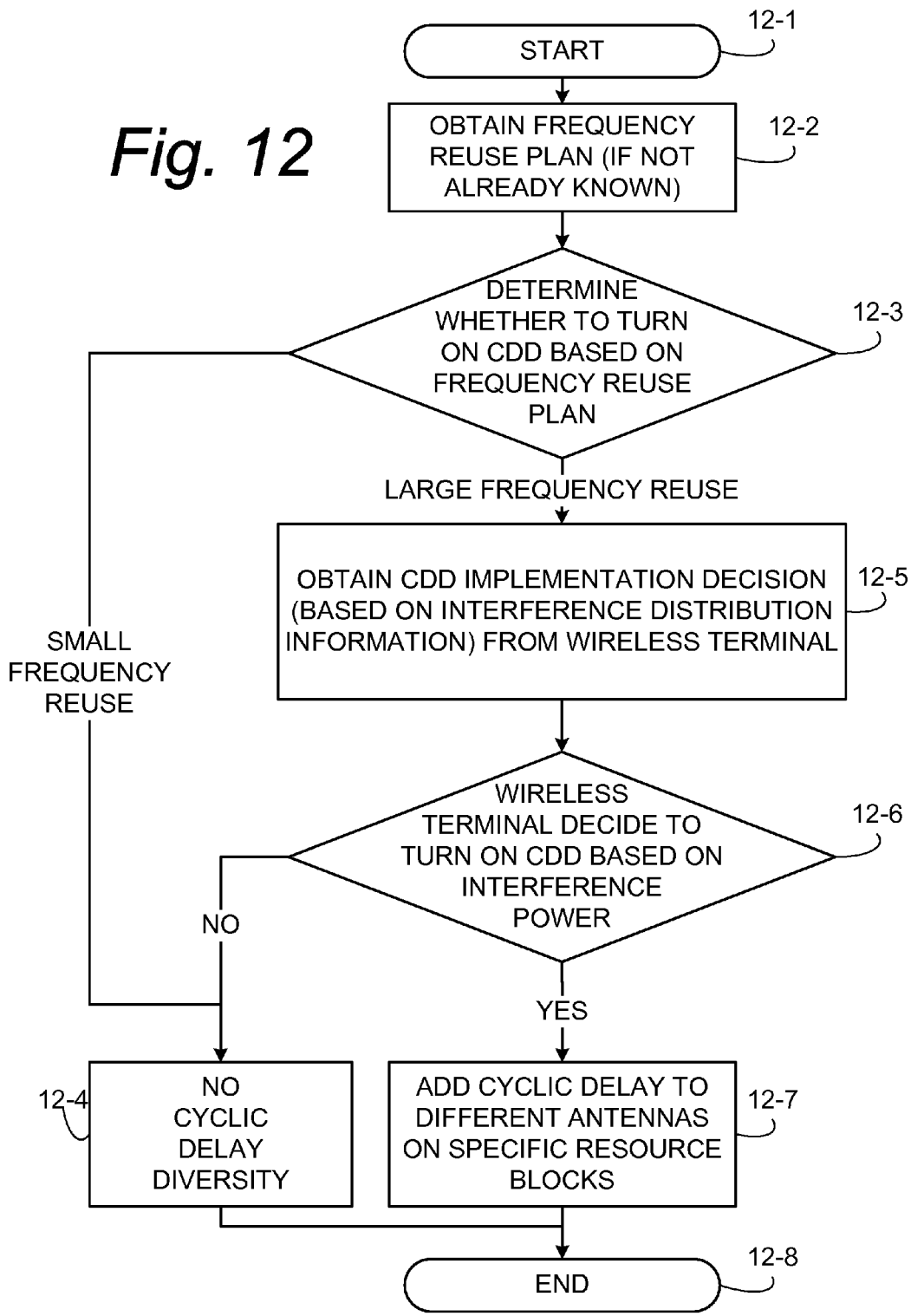
FIG. 12 is a flowchart illustrating example acts or steps performed by distributed CDD decision logic for the embodiment of FIG. 11.

In the example embodiment of FIG. 9, the example acts of the CDD decision logic of FIG. 10 can be performed by CDD decision logic 52 of radio base station 26(9). In yet another embodiment illustrated by way of example in FIG. 11, the CDD decision logic can be distributed between radio base station 26(11) and wireless terminal 30(11) and can operate in the manner depicted by FIG. 12. The embodiment of FIG. 11 and mode of FIG. 12 are essentially similar to FIG. 9 and FIG. 10, respectively, except for differing numbered elements and differing suffixed action numbers. In particular, FIG. 11 shows CDD decision logic being distributed between CDD decision logic 52(11) in radio base station 26(11) and CDD decision logic 70(11) of wireless terminal 30(11). For example, in the FIG. 11 embodiment and mode of FIG. 12, after CDD decision logic 52(11) has made its determination based on frequency reuse plan (as act 11-3), as act 11-5(12) the CDD decision logic 52(11) checks a report of the decision made by CDD decision logic 70(11) based on interference distribution. If the CDD decision logic 70(11) has determined that it thinks CDD should be turned on based on interference power measured or experienced at wireless terminal 30(11), as act 12-7 the CDD decision logic 52(11) adopts the decision of CDD decision logic 70(11) and turns on the CDD (see act 12-7). On the other hand, if the CDD decision logic 70(11) has determined that it thinks CDD is not necessary based on interference power measured or experienced at wireless terminal 30(11), as act 12-6(12) the CDD decision logic 52(11) adopts the decision of CDD decision logic 70(11) and does not turn on the CDD (see act 12-4).

Act 10-8 of the CDD decision logic includes determining whether to turn on either fixed delay for the cyclic delay diversity (CDD) or an adaptive delay. As explained above, by "fixed delay" it is meant that the delay from one delay element 49 to another, and thus the delay from one transmit antenna 38 to another, is fixed or of the same delay interval. By "adaptive" it is meant that the delay can vary between antennas and/or over time.

As a result of execution of the CDD decision logic of FIG. 10, for the wireless terminals that are located in the area where noise have the major impact on SINR, e.g., close to the cell center, a decision is made to turn on CDD, either with the fixed delay (or phase shift) or the adaptive delay. For the wireless terminals that locate in the area where interference has the major impact on SINR, e.g., close to the cell edge, it is not necessary to turn on CDD, i.e., no need to feedback any CDD related parameters to the system.

In like manner as FIG. 4, for the embodiments of FIGS. 9 and 11 (and corresponding modes of operation of FIG. 10 and FIG. 12, respectively) the radio base station may also obtaining such further feedback from the wireless terminal as may be needed for implementation of adaptive CDD.

Thus, as understood from the foregoing, in a multi-cell environment, implement fractional frequency reuse, inter-cell interference coordination (ICIC) and CDD together, are utilized to improve OFDM-MIMO system performances and reduce any useless CDD applications. CDD can be triggered based on the interference measurement and/or based on the inter-cell communication or inter-cell coordination.

For the embodiments in which frequency reuse is utilized as a criteria for the determination whether or not to use cyclic delay diversity (CDD), each radio base station can obtain the frequency reuse or ICIC planning on different resource blocks of the other cells, based on the estimated or predicted interference. The signal to interference noise ratio (SINR) for a specific resource block is described by Expression (2). As used herein and in Expression (2) in particular, interference (power) is that which comes from allocation of the same resource block to other wireless terminals in the interfering cells.

$$SINR = \frac{\text{Signal power}}{\text{interference} + \text{Noise}} \quad \text{Expression (2)}$$

As used herein, "total noise" and "total noise power" includes both interference power both and white noise power. Interference power comes from the allocation of the same resource block to other wireless terminals in interfering cells. The ratio of interference power to the total noise power is used to determined whether to apply/implement cyclic delay diversity (CDD). The interference power can be estimated as follows: A base station employs various pilot signal values, which other base stations cannot use in other cells, and which can be used to estimate the white noise power. Yet other pilot signal values are employed not only by a reference cell/base station, but also by base stations of interfering cells, which can be used to estimate the total noise power. Thus, the interference power equals the total noise power less the white noise power.

In addition, for the systems with the inter-cell communication or coordination, the frequency planning can be done by considering the CDD decision of the interfering cells. When the network is aware of which wireless terminals turn on CDD, the system can then employ frequency domain scheduler to obtain the multi-user diversity gain. For different resource blocks, different cells can have a different frequency reuse plan, but the different frequency reuse can lead to different co-channel interference distribution, which have a big contribution to the usage of CDD.

Figure 13:
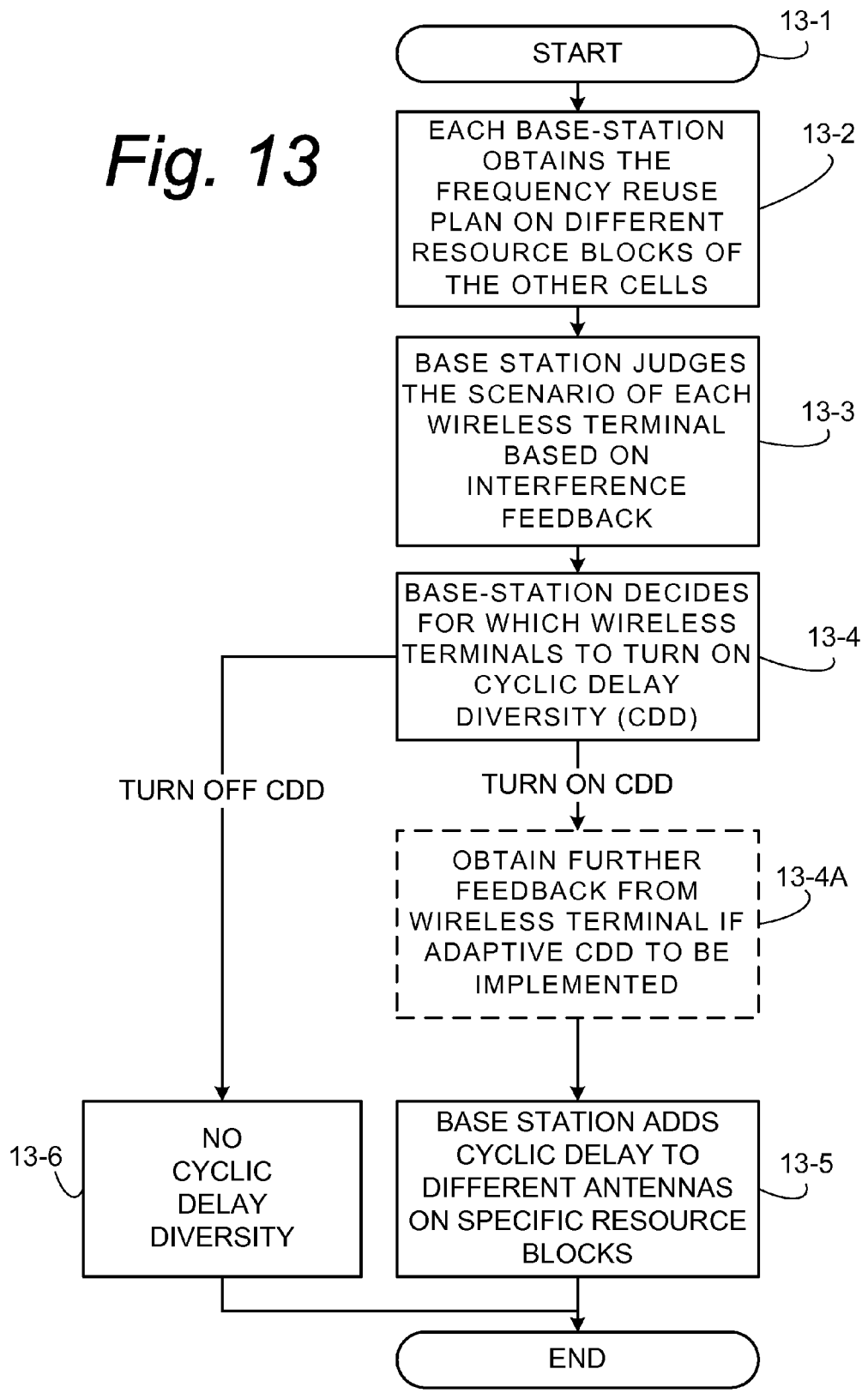
FIG. 13 is a flowchart illustrating example acts or steps performed by another embodiment.

If the CDD decision changes very slowly, the solution can be further simplified to comprise the basic acts shown in FIG. 13. As act 13-2, each base-station obtains the frequency reuse plan on different resource blocks of the other cells. Then, as act 13-2, and based on the statistics of the channel quality indication (CQI) of the wireless terminal or other feedback about the interference, the base station can judge the scenario of each wireless terminal, e.g., user position (cell center or cell edge), geometric factor (inter-cell interference dominated or noise dominated), etc. Based on the above information, as act 13-3 the base-station can decide for which wireless terminals to turn on cyclic delay diversity (CDD). If CDD is to be implemented, as act 13-5 the system can then further employ its frequency domain scheduler (e.g., resource allocator/scheduler 42) and CDD implementation unit 46 to obtain the multi-user diversity gain. Otherwise (act 13-6) the CDD is turned off.

Thus, as understood, e.g., from the foregoing, in a multi-cell environment, CDD may be turned on only for some of users, depending on the interference measurements or prediction, but for other users be turned off. In addition, the frequency reuse planning can be decided with CDD decision jointly. Whether to turn on CDD or not can be either decided by base station or wireless terminal, which involves different signalling or feedbacks depending on which unit is the decision maker. When introducing the inter-cell communication or inter-cell coordination, the base station can take a static-CDD decision for each user with almost no increase of the signalling overhead.

The present technology exploits the benefits from both cyclic delay diversity (CDD) and frequency reuse technologies for OFDM-MIMO system in multi-cell scenario.

The technology thus has many advantages. As a first example, the technology is an interference-dependent application of CDD technologies, which switches CDD on in the noise dominating area, but switches CDD off in the interference dominating area. Since CDD only bring gains in some specific scenarios, the technology reduces useless CDD applications and therefore reduces the related system signalling overhead but still keeps CDD support for those users that can gain by using CDD.

As a further advantage, the technology is also a joint frequency reuse and MIMO scheme, which can obtain benefits from both technologies. Frequency reuse plan of an OFDM system can have an important contribution to the co-channel interference, but enables a cellular system to handle a huge number of calls with a limited number of channels. The switching of CDD on/off based on interference distribution can jointly together with frequency reuse, i.e., with the knowledge of frequency reuse plan, well adapt the CDD potential gain in frequency domain flat SINR scenario.

Further, this technology is compatible with and can exploit the OFDM system performances with MIMO and frequency reuse technologies. The technology can be applied to and used in conjunction with 3GPP LTE [3GPP TR 25.814, "3rd Generation Partnership Project; Technical Specification Group Radio Access Network; Physical Layer Aspects for Evolved UTRA (Release 7)"], IEEE802.16, IEEE802.11n and standards alike It will be appreciated that functionalities such as CDD decision logic 52 and CDD decision logic 70 can be performed such devices as a controller or processor as those terms are expansively defined herein.

This invention is not limited to any particular way of obtaining interference distribution information, since the person skilled in the art knows how to obtain interference information in various ways (all of which are encompassed herein). Similarly, the invention is not limited to any particular way of applying delay or phase shift parameters to the CDD implementation. Several example ways are described by documents listed and/or incorporated herein.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A radio base station comprising:
    plural transmit antennas;
    a controller configured to selectively implement cyclical delay diversity for a radio frequency connection with a wireless terminal in accordance with perceived interference distribution at the wireless terminal, selective implementation of the cyclical delay diversity alternatively resulting in: (1) only an undelayed data stream of the radio frequency connection being transmitted from the radio base station, or (2) a same data stream of the radio frequency connection being applied with differing delay or phase shift to respective differing ones of the plural transmit antennas.

2. The apparatus of claim 1, wherein the controller is configured to receive from the wireless terminal a parameter which facilitates implementation of adaptive cyclic delay diversity.

3. The apparatus of claim 1, wherein the controller is configured to receive an indication of the interference distribution from the wireless terminal.

4. The apparatus of claim 3, wherein the controller is configured to receive an indication of measured signal to interference noise ratio (SINR) from the wireless terminal.

5. The apparatus of claim 3, wherein the controller is configured to receive the indication of the interference distribution from the wireless terminal and to use the indication of the interference distribution to determine whether to implement the cyclical delay diversity.

6. The apparatus of claim 3, wherein the controller is configured to implement the cyclical delay diversity when the indication of the interference distribution indicates that noise is a greater factor than interference in a signal to interference noise ratio (SINR) for the wireless terminal.

7. The apparatus of claim 3, wherein the controller is configured to implement the cyclical delay diversity for the wireless terminal in a noise-dominated area of a cell served by the radio base station, and wherein the radio base station is configured not to implement the cyclical delay diversity for the wireless terminal in an interference-dominated area of the cell served by the radio base station.

8. The apparatus of claim 1, wherein the controller is configured to receive frequency reuse plan information for interfering cells as an indication of the interference distribution at the wireless terminal and to use the indication of interference to determine whether to implement the cyclical delay diversity.

9. The apparatus of claim 8, wherein the controller is configured to implement the cyclical delay diversity wherein frequency reuse is above a predetermined frequency reuse number.

10. The apparatus of claim 1, wherein the controller is configured to determine whether to implement the cyclical delay diversity in accordance with the perceived interference distribution at the wireless terminal.

11. The apparatus of claim 1, wherein the controller is configured to determine whether to implement the cyclical delay diversity in accordance with two criteria;
    wherein a first criteria comprises frequency reuse plan information for interfering cells;
    wherein a second criteria comprises interference power as measured at the wireless terminal.

12. The apparatus of claim 1, further comprising a switch responsively connected to the controller and configured to apply a data stream with a time delay to at least one of the plural transmit antennas when the controller implements the cyclic delay diversity.

13. The apparatus of claim 12, wherein the switch is configured not to apply the data stream with the time delay to the at least one of the plural transmit antennas when the controller does not implement the cyclic delay diversity.

14. A radio base station comprising:
    plural transmit antennas;
    a controller configured to selectively implement cyclical delay diversity using the plural antennas for a radio frequency connection with a wireless terminal in accordance with perceived interference distribution at the wireless terminal, wherein the controller is configured not to implement the cyclical delay diversity when either a first criteria or a second criteria indicates that cyclical delay diversity is not necessary to obtain signal gain for the wireless terminal, and wherein the controller is configured to implement the cyclical delay diversity when both the first criteria and the second criteria indicate that cyclical delay diversity is desirable to obtain the signal gain for the wireless terminal.

15. The apparatus of claim 14, wherein the first criteria comprises frequency reuse plan information for interfering cells and wherein the second criteria comprises interference power as measured at the wireless terminal.

* * * * *